United States Patent Office 3,553,150
Patented Jan. 5, 1971

3,553,150
TERTIARY ALKYL AMINE AND ALKYL ACID PHOSPHATE CORROSION INHIBITOR COMPOSITION
Robert H. Rosenwald, Western Springs, and Leonhard A. Goeller, Des Plaines, Ill., assignors to Universal Oil Products Company, Des Plaines, Ill., a corporation of Delaware
No Drawing. Filed Aug. 20, 1968, Ser. No. 753,864
Int. Cl. C23f *11/10*
U.S. Cl. 252—389          10 Claims

ABSTRACT OF THE DISCLOSURE

Corrosion inhibitor composition of (1) one basic equivalent proportion of tertiary alkyl primary amine of 6–30 carbon atoms and (2) at least two acidic equivalent proportions of alkyl acid phosphate of 6–20 carbon atoms. The composition also may contain organic acid. The composition is particularly useful to inhibit pipe line and storage corrosion of hydrocarbon oils.

BACKGROUND OF THE INVENTION

In the manufacture, handling, transportation and/or use of various organic substances, corrosion problems occur due to the presence of varying amounts of water in solution or in suspension in the organic substances. Illustrative organic substances includes particularly hydrocarbon distillates as gasoline, jet fuel, kerosene, lubricating oil, fuel oil, diesel oil, crude oil, etc. Other specific oils include cutting oils, soluble oils, slushing oils, rolling oils, etc. which may be of mineral, animal or vegetable origin. Other organic substances include various coating compositions as grease, wax, household oil, paints, lacquer, etc. Still other organic substances include alcohols ketones, esters, ethers, dioxane, amino compounds, amides etc. In spite of all reasonable and practical precautions which are taken to avoid the presence of water, an appreciable quantity of water separation is found as a film or in minute droplets in the pipe line or on container walls or even in small pools at the bottom of the container. This results in corrosion of the metal surfaces and contamination of the organic substance by the corrosion products.

A number of amine-phosphate salts has been proposed heretofore to retard corrosion problems. In general, these salts were either basic or neutral because of the belief that the corrosion problems were due to acidic materials and, therefore, would be cured by neutralizaton of the acidic corrodants. These different salts were effective in varying degrees. However, while the corrosion problem may be solved, the emulsification problem remains. Because of this, the corrosion inhibitors do not meet the military specifications as to water tolerance.

DESCRIPTION OF THE INVENTION

The present invention provides a novel corrosion inhibitor composition which is both effective in inhibiting corrosion and also meets the military test for water tolerance. The novel composition of the present invention comprises a mixture of a specific amine and alkyl phosphate in critical proportions.

In one embodiment the present invention comprises a corrosion inhibitor composition of (1) one basic equivalent proportion of a tertiary alkyl primary amine contaling from about 6 to about 30 carbon atoms and (2) at least two acidic equivalent proportions of an alkyl acid orthophosphate containing from about 6 to about 20 carbon atoms.

In another embodiment, the present invention comprises a corrosion inhibitor composition also containing an organic acid of at least 8 carbon atoms.

As hereinbefore set forth, one component of the inhibitor composition of the present invention is a tertiary alkyl primary amine containing from about 6 to about 30 carbon atoms. In a preferred embodiment, the amine contains from about 10 to about 25 carbon atoms. As a particular advantage of the present invention, mixtures of tertiary alkyl primary amines are available commercially, generally at a lower cost, and are advantageously used in the inhibitor composition of the present invention. One such mixture is available commercially as "Primene 81–R" and is a mixture of $C_{12}$ to $C_{14}$ tertiary alkyl primary amines. Another mixture is available as "Primene JMT" and is a mixture of tertiary $C_{18}$ to $C_{22}$ amines.

While the above are preferred, it is understood that tertiary alkyl primary amines containing from about 6 to about 30 carbon atoms may be used and thus will be selected from tert-hexylamine, tert-heptylamine, tert-octylamine, tert-nonylamine, tert-decylamine, tert-undecylamine, tert-dodecylamine, tert-tridecylamine, tert-tetradecyl amine, tert-pentadecylamine, tert-hexadecylamine, tert-octadecylamine, tert-nonadecylamine, tert - eicosylamine, tert-heneicosylamine, tert-docosylamine, tert-tricosylamine, tert-tetracosylamine, tert - pentacosylamine, tert-hexacosylamine, tert-heptacosylamine, tert-octocosylamine, tert-nonacosylamine, tert-triacontylamine and mixtures thereof. It is understood that the various amines are not necessarily equivalent in the same or different diluents.

Another component of the inhibitor composition is an alkyl acid orthophosphate containing from about 6 to about 20 carbon atoms. Here again mixtures are available commercially, generally at a lower cost, and include mixtures of the mono- and dialkyl acid orthophosphates. The use of such lower cost mixtures is an additional advantage of the present invention. Especially desirable is a mixture of mono- and diisooctyl acid orthophosphates. Other phosphates include monohexyl acid orthophosphate, dihexyl acid orthophosphates, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphate, mononoyl acid orthophosphate, dinonyl acid orthophosphate, mixture of mono- and dinonyl acid orthophosphate, monodecyl acid orthophosphate, didecyl acid orthophosphate, mixtures of mono- and didecyl acid orthophosphate, monoundecylacid orthophosphate, diundecyl acid orthophosphate, mixture of mono- and diundecyl acid orthophosphate, monododecyl acid orthophosphate, diodecyl acid orthophosphate, mixture of mono- and diodecyl acid orthophosphate, monotridecyl acid orthophosphate, ditridecyl acid orthophosphate, mixture of mono- and ditridecyl acid orthophosphate, monotetradecyl acid orthophosphate, ditetradecyl acid orthophosphate, mixture of mono- and ditetradecyl acid orthophosphate, monopentadecyl acid orthophosphate, dipentadecyl acid orthophosphate, mixture of mono- and dipentadecyl acid orthophosphate, monohexadecyl acid orthophosphate, dihexadecyl acid orthophosphate, mixture of mono- and dihexadecyl acid orthophosphate, monoheptadecyl acid orthophosphate, diheptadecyl acid orthophosphate, mixture of mono- and diheptadecyl acid orthophosphate, monooctadecyl acid orthophosphate, diocadecyl acid orthophosphate, mixture of mono- and dioctadecyl acid orthophosphate, mononadecyl acid orthophosphate, dinonadecyl acid orthophosphate, mixture of mono- and dinonadecyl acid orthophosphate, monoeicosyl acid orthophosphate, deicosyl acid orthophosphate and mixtures of mono- and dieicosyl acid orthophosphate. It is understood that the alkyl moiety may be straight or branched chain and that it may be of primary, secondary or tertiary configuration. Here again, it is understood that the different alkyl acid orthophosphates are not necessarily equivalent in the same or different substrates.

In another embodiment of the present invention, the mixture of amine and phosphate is used in admixture with an organic acid. As will be shown by the examples appended to the present specifications, the addition of the organic acid appears to even further improve the properties of the composition, apparently through a synergistic effect. The organic acid contains from about 8 to about 50 carbon atoms and may be a mono- or polybasic acid. Conveniently the monobasic acid is a fatty acid and thus will be selected from caprylic, capric, lauric, myristic, stearic, arachidic, behenic, lignoceric, cerotic, decylenic, dodecylenic, palmitoleic oleic ricinoleic, petroselinic, vaccenic, linoleic, gadoleic, cetoleic, erucic, celacholeic, phenylstearic, toluic, salicylic, anisic, gallic, syringic, abietic, etc.

The polycarboxylic acids include succinic, glutaric, adipic, pimelic, suberic, azelaic, sebacic, phthalic, etc., aconitic, citric, etc., hemimellitic, trimesic, prehnitic, mellophanic, pyromellitic, mellitic, etc. and higher molecular weight polybasic carboxylic acids including those referred to as dimer acid, trimer acid, etc. It is understood that the acid may contain alkyl and/or alkenyl substituents as, for example, dodecenyl succinic acid, and also that a mixture of acids may be employed.

Here again there are various mixtures of polybasic acids available commercially at lower costs and advantageously are used in the present invention. These mixtures include various residue acids as, for example, "VR-1 Acid" which is a mixture of polybasic acids, predominantly dibasic, obtained as a by-product in the preparation of sebacic acid by fusion of castor oil with alkali. This acid has an average molecular weight of 500-600, an acid number of 134-160, a saponification number of 174-179, and an iodine number of 53-60. Another mixed acid of substantially the same composition is available commercially under the trade name of "D50MEX Acid."

Another preferred acid comprises a mixed acid being marketed commercially under the trade name of "Empol 1022." This dimer acid is a dilinoleic acid and is represented by the following general formula:

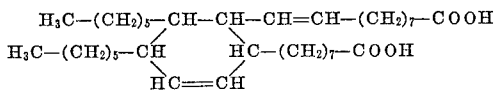

This acid is a viscous liquid, having an apparent molecular weight of approximately 600. It has an acid value of 180-195, a neutralization equivalent of 290-310, a refractive index at 25° C. of 1.4919, a specific gravity at 15.5° C./15.5° C. of 0.95, a flash point of 530° F., a fire point of 600° F., and a viscosity at 100° C. of 100 centistokes.

It is understood that the different organic acids are not necessarily equivalent in their use with different amine and phosphate mixtures However, as will be shown in the appended examples there appears to be a synergistic effect with such mixtures in effecting even greater corrosion inhibition.

The inhibitor composition of the present invention is prepared in any suitable manner. However, as hereinbefore set forth, it is an essential requirement that the phosphate is used in a proportion of at least two acidic equivalents per one basic equivalent of the amine. The phosphate preferably is used in an acidic equivalent of from two to five and more particularly of from two to four acidic equivalents per one basic equivalent of amine. Similarly, when employed, the organic acid is used in at least one acidic equivalent proportion and more particularly from one to about four acidic equivalents per one basic equivalent of the amine. It is understood that the acidic equivalents of both the phosphate and of the organic acid will depend on whether the mono-, di- or mixed alkyl acid orthophosphates and also on whether a mono- or polyorganic carboxylic acid is used.

As hereinbefore set forth, the inhibitor composition is prepared in any suitable manner. In one method, the amine is formed as a solution in a suitable solvent and then is neutralized with an equivalent of the phosphate, after which excess phosphate is added to prepare a mixture of the desired acidic to basic equivalents. When used, the organic acid is then added to the composition in a concentration to form the desired proportions. Any suitable solvent may be used, including a saturated hydrocarbon as hexane, heptane, octane, nonane, decane, etc., or an aromatic hydrocarbon as benzene, toluene, xylene, ethylbenzene, cumene, etc. In a preferred embodiment, a naphtha fraction is used as the solvent because of its low cost. It is understood that any suitable method of preparing the composition and that any suitable solvent may be used.

In the previous discussion, the use of low cost mixtures of amines, phosphates, organic acids and solvents is emphasized. The low cost of the inhibitor composition is an important criterion in order that the inhibitor will be commercially acceptable. Thus, it is necessary that the inhibitor composition is an effective inhibitor, meets the water tolerance specifications and still is relatively inexpensve. Also, for economic reasons, the inhibitor composition is used in as low a concentration as practical and thus generally will be used in a concentration of from about 10 to about 20 parts per million (based on active ingredients). It is understood that lower or hgher concentrations, which may range from 5 to about 500 parts per million, may be used when desired. The inhibitor composition is incorporated in the substrate in any suitable manner and generally by forming a solution in the manner hereinbefore described and adding the solution to the substrate in any suitable manner, preferably with some form of turbulence or mixing in order to insure even distribution of the inhibitor composition in the subsrate.

The following examples are introduced to illustrate further the novelty and utility of the present invention but not with the intention of unduly limiting the same.

In the following examples the corrosion properties were measured in accordance with test procedure MIL–I–25017C which is based on ASTM Spindle test D665 and also referred to as the Steam-Turbine Oil Corrosion Test. In the modification used, hot rolled, mild-carbon steel spindles are polished and soaked in inhibited isooctane in a beaker. Synthetic sea water is added to the beaker and the system is stirred at 100° F. for 5 hours. At the end of the test period, the spindles are rinsed and examined for rust. Less than 6 rust spots of less than 1 mm. diameter on a spindle is passing. Any spindle having one or more rust spots of greater than 1 mm. diameter also is considered as a failure.

The water emulsionfication is evaluated according to the Water Separometer Index Modified Test (WSIM). Briefly, in this test a small volume of water is added to synthetic jet fuel and the fuel is recycled. The reservoir is emptied and is passed first through a glass wool coelescer pad and then through a photocell where the percent light transmission is measured as a determination of the turbidity of the fuel mixture. In order to pass this test, the light transmission must be at least 70%.

In preparing the amine salts, the amine was formed as a solution in a naphtha solvent and neutralized with the phosphate, after which excess phosphate was added as required. When an organic acid was used, the acid was added thereafter. Stock solutions of the mixture in isooctane were made for use in the evaluations.

EXAMPLE I

The corrosion inhibitor composition of this example is a mixture of one basic equivalent of tertiary $C_{12}$–$C_{14}$ primary alkyl amines ("Primene 81–R") and two acidic equivalents of mixed mono- and diisooctyl acid orthophosphates. When evaluated in a concentration of 20 parts per million according to MIL–I–25017C, the composition passed the test. When evaluated in the same concentration according to the WSIM test, the mixture had a light transmission of 95%.

Another mixture was made to contain the above ingredients in a proportion of one equivalent of amine and three equivalents of phosphate. This mixture when evaluated in a concentration of 20 parts per million, resulted in a light transmission of 84% and also passed the MIL–I–25017C test.

Still another mixture of the above ingredients in a proportion of one basic equivalent of amine and four acidic equivalents of phosphate was evaluated as above. This mixture also passed the MIL–I–25017C test and had a light transmission of 85% when used in a concentration of 20 parts per million.

From the above, it will be seen that the mixtures set forth above were effective corrosion inhibitors and also satisfactorily passed the Water Separometer Test.

EXAMPLE II

Other inhibitor compositions were made in the same manner as described in Example I except that the mixture also contained "D50MEX Acid" which has been hereinbefore described and comprises principally dibasic acids having an average of 36 carbon atoms. The inhibitor composition of one basic equivalent of "Primene 81–R" amine, two acidic equivalents of mixed mono- and diisooctyl acid orthophosphates and one acidic equivalent of "D50MEX Acid," in a concentration of 20 parts per million, passed corrosion test MIL–I–25017C and had a light transmission of 87%. This mixture also passed the corrosion inhibitor test in an evaluation made using 10 parts per million of the inhibitor composition and also had a light transmission of 90% when evaluated by the WSIM test.

EXAMPLE III

The criticality of using at least two acidic equivalents of the phosphate is demonstrated in another evaluation made with the composition of two amine equivalents of "Primene 81–R" and one acidic equivalent each of the mixed mono- and diisooctyl acid orthophosphates and of "D50MEX Acid." While this mixture, in a concentration of 20 parts per million, did pass the corrosion test, the light transmission was only 47% and thus failed the WSIM Test.

EXAMPLE IV

The criticality of using a tertiary alkyl primary amine is illustrated in the following evaluations made with either equal equivalents of technical oleyl amine and mixed mono- and diisooctyl acid orthophosphate or these ingredients in a proportion of one basic equivalent and two acidic equivalents. In a concentration of 10 parts per million, these mixtures had light transmissions of 22% and 31% respectively.

EXAMPLE V

Another series of evaluations were made with mixtures of N-oleyl-diaminopropane and either equal or double acidic equivalents of the mixed mono- and diisooctyl acid orthophosphates. Here again, when evaluated in the WSIM Test, these compositions in a concentration of 10 parts per million had light transmissions of 20 and 27% respectively.

EXAMPLE VI

For comparative purposes, the following data are presented to show the results obtained when utilizing each ingredient separately. When evaluated in the corrosion test (MIL–I–25017C), in a concentration of 20 p.p.m. or 30 p.p.m. "Primene 81–R" failed to pass. Mixed mono- and diisooctyl acid orthophosphates, in a concentration of 10 parts per million, had a light transmission of only 39% when evaluated in the WSIM Test. The "D50MEX Acid" tested at a concentration of 20 p.p.m. was rated as permitting light rusting.

EXAMPLE VII

The inhibitor composition of this example is a mixture of one basic equivalent of "Primene JMT" which, as hereinbefore set forth, is a mixture of tertiary $C_{18}$–$C_{22}$ amines, and four acidic equivalents of mixed mono- and diisooctyl acid orthophosphates. When evaluated, in a concentration of 20 parts per million, this composition passed the MIL–I–25017C Test and also resulted in a light transmission of 85% when evaluated in the WSIM Test.

EXAMPLE VIII

The inhibitor composition of this example is a mixture of one basic equivalent of "Primene JMT" and two acidic equivalents of mixed mono- and ditridecyl acid orthophosphates. This inhibitor composition is incorporated in fuel oil being transported via pipe line and serves to retard corrosion and still meets the water tolerance test.

I claim as my invention:

1. Corrosion inhibitor composition of (1) one basic equivalent proportion of a tertiary alkyl primary amine containing from about 6 to about 30 carbon atoms and (2) at least two acidic equivalent proportions of an alkyl acid orthophosphate containing from about 6 to about 20 carbon atoms.

2. The composition of claim 1 in which said basic equivalent proportion and said acidic equivalent proportion are in a ratio of 1:2 to 1:4.

3. The composition of claim 1 in which said amine is a mixture of $C_{12}$ to $C_{15}$ tertiary alkyl primary amines.

4. The composition of claim 1 in which said amine is a mixture of $C_{18}$ to $C_{24}$ tertiary alkyl primary amines.

5. The composition of claim 1 wherein said phosphate is a mixture of mono- and dialkyl acid orthophosphates.

6. The composition of claim 5 wherein said mixture is a mixed mono- and diisooctyl acid orthophosphates.

7. The composition of claim 5 wherein said mixture is a mixed mono- and ditridecyl acid orthophosphates.

8. The composition of claim 1 also containing at least one acidic equivalent proportion of an carboxylic acid containing 8 to 50 carbon atoms.

9. The composition of claim 8 in which said carboxylic acid is in an acidic equivalent of from one to four per one basic equivalent of said amine.

10. The composition of claim 8 in which said carboxylic acid is a mixed dibasic acid having an average of about 36 carbon atoms.

References Cited

UNITED STATES PATENTS

| | | | |
|---|---|---|---|
| 2,863,746 | 12/1958 | Cantrell et al. | 252—389 |
| 3,325,565 | 6/1967 | Popkin | 252—389 |
| 3,397,150 | 8/1968 | Burt et al. | 252—389 |

RICHARD D. LOVERING, Primary Examiner

I. GLUCK, Assistant Examiner

U.S. Cl. X.R.

106—14; 208—47; 252—8.55, 390